Dec. 18, 1923.

B. F. SEYMOUR 1,477,914

VEHICLE BODY SUSPENSION

Filed Dec. 14, 1920   3 Sheets-Sheet 1

Inventor
Benjamin F. Seymour
By W. H. Byrne
Attorney

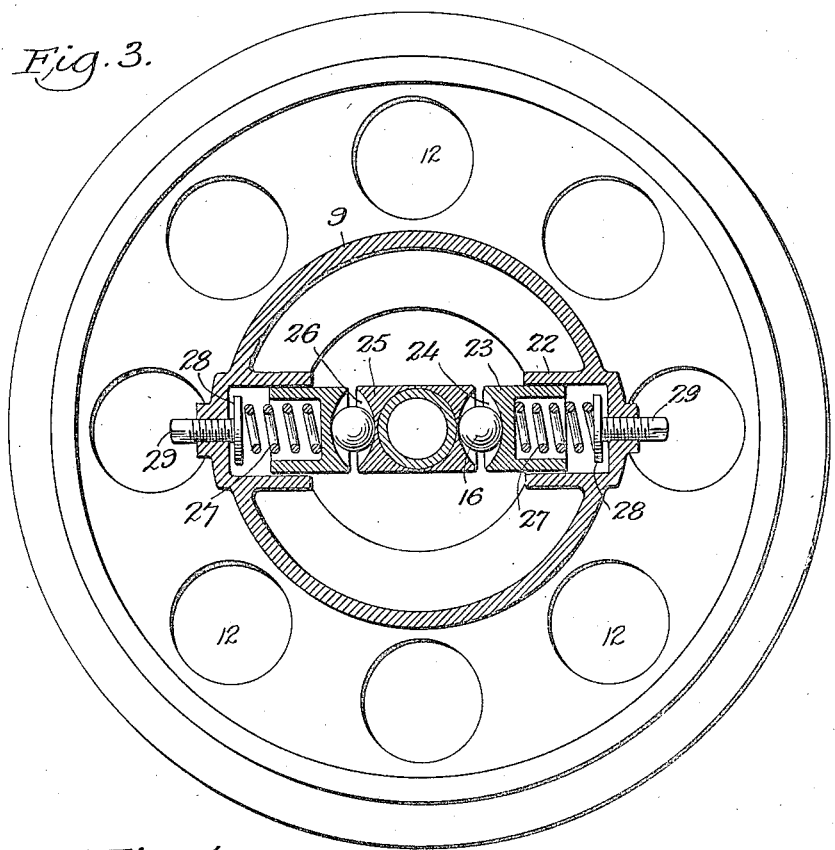
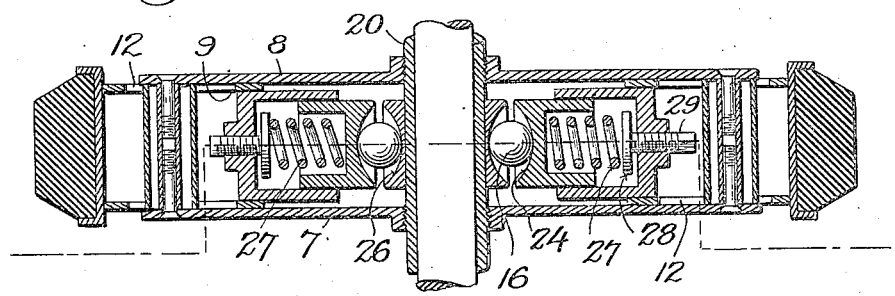

Dec. 18, 1923.

B. F. SEYMOUR 1,477,914

VEHICLE BODY SUSPENSION

Filed Dec. 14, 1920

3 Sheets-Sheet 3

Patented Dec. 18, 1923.

1,477,914

UNITED STATES PATENT OFFICE.

BENJAMIN F. SEYMOUR, OF WASHINGTON, DISTRICT OF COLUMBIA.

VEHICLE BODY SUSPENSION.

Application filed December 14, 1920. Serial No. 430,693.

*To all whom it may concern:*

Be it known that I, BENJAMIN F. SEYMOUR, a citizen of the United States, residing at Washington, in the District of Columbia, have invented certain new and useful Improvements in Vehicle Body Suspensions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial Numbers 302,411; 302,414; 302,415; 302,416; 310,970; 322,627; 332,628; 330,374; 336,632; 342,284; 342,286; 361,933, and 367,713.

The arrangement shown herein is further characterized in that uniformly distributed and co-operable devices are provided for the driving and driven elements to the end of obtaining equal and uniformly distributed stresses under all working conditions, whereby to obtain maximum efficiency and ease of operation.

The invention is shown by way of illustration in the accompanying drawings wherein:—

Figure 1:
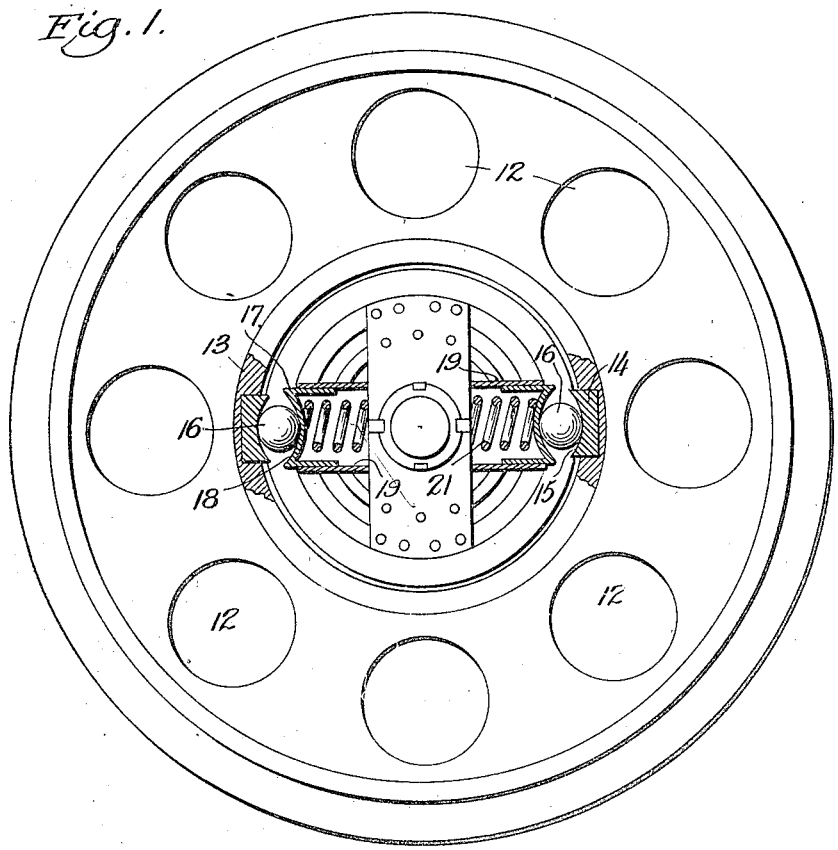
Figure 2:
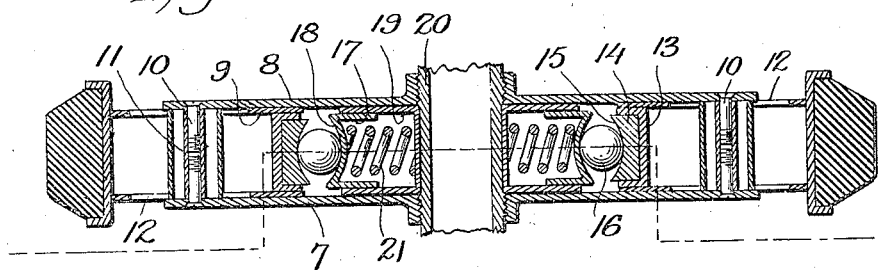
Figure 5:
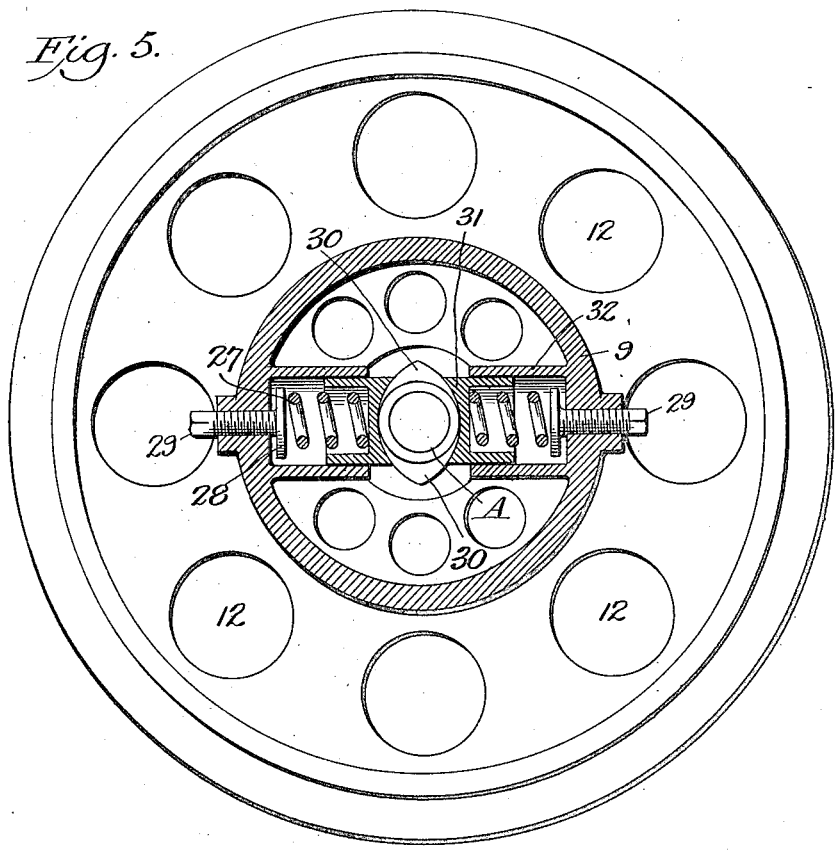
Figure 6:
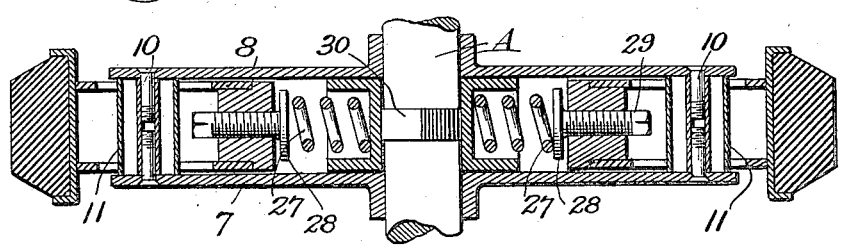

Figure 1 is a front elevational view of the wheel partly in section,

Figure 2 a horizontal sectional view thereof,

Figure 3 a front elevation view showing a modified structure,

Figure 4 a longitudinal sectional view thereof,

Figure 5 a front elevational view of a further modified structure and,

Figure 6 a horizontal sectional view of the same.

Referring to the construction in further detail and wherein like reference characters designate corresponding parts in the different views, the construction consists of a hub portion formed of two side plates, or housing members 7 and 8 which are disposed against the inner rim portion 9 of the wheel, as shown. The two hub members 7 and 8 are secured to the wheel rim by the series of pairs of bolts 10 screwed into threaded sleeves 11 that serve as spacing elements and which are located within the openings 12 of the wheel rim. It will be understood, of course, that said spaces 12 are provided to allow the wheel rim to have limited radial and angular movement with respect to the hub portion of the wheel.

The resilient drive and bearing device per se consists of an inner rim portion 13 having bearing blocks 14 that are formed with receding or curved inner faces 15 to receive the bearing members 16 which are shown herein as of spherical shape but it will be understood of course that cylindrical rollers may be employed; and it will be further understood that in place of the single pair of diametrically disposed members 16 two or more pairs of such devices may be employed.

Corresponding with said ball members 16 is a pair of bearing members or heads 17 having recessed faces 18 that contact with members 16, the said heads 17 being molded to telescope or have limited radial movement within the tubular casings 19 that are mounted directly on the inner hub part 20. Springs 21 are contained within the chambers formed by the members 17 and 19 and operate to keep the bearing members 16 under the required tension against the blocks 14 on the rim.

It will therefore be seen from the foregoing that any motion or shock of the shaft or axle will transmit a like movement to the wheel rim through the medium of the cone elements 15, 16 and 17, and that such transmission will be flexible or resilient in nature. And it will be further seen that any jarring motion imparted to the wheel will be resiliently taken up by the cooperating cone elements together with the spring.

Referring to the construction shown in Figs. 3 and 4 the general principles of structure and manner of operation are the same as that described for Figs. 1 and 2. This construction is however characterized in that the rim portion 9 is provided with a diametrically disposed pair of cylindrical portions 22 having open inner ends and receiving the two bearing members or heads 23 having concaved surfaces 24 that receive the spherical members 16. Each of a pair of blocks 25 mounted on the hub member 20 has concaved portions 26 receiving the bearing members 16 and co-act therewith as above described.

The elements 16, 24 and 26 are maintained under the required tension by the springs 27, located within the casing provided by the members 22 and 23, and a pressure disk 28 on an adjusting screw serves for keeping the spring 27 under the required tension.

In the arrangement shown in Figs. 5 and 6 the principal structure and manner of operation are the same as that just explained though in this instance a pair of cam elements 30 is affixed to the axle A in such a manner that the opposed salients co-act with the bearing members 31 which have bearing surfaces complemental to the cam elements, as shown.

The two bearing members 31 are mounted to telescope within the chambers formed by the casings or cylindrical portions 32 on the inner rim part 9 of the wheel, and pressure on the two springs 27 is herein provided by the adjustable disks 28 as in Figs. 3 and 4.

The invention is not to be understood as being limited to the details of construction herein shown and described, as these may be varied widely without departing from the spirit of the invention.

Having thus described my invention what is claimed as new is:—

1. In a combined resilient bearing and drive for vehicle wheels, the combination of a hub portion having side plates, a rim portion mounted to have limited radial movement between said side plates, radially disposed telescoping devices mounted on the hub between said side plates, tensioning devices associated with said telescoping devices respectively, said telescoping devices and the wheel rim portion constructed with cone elements, and spherical members interposed between said cone elements, substantially as set forth.

2. In a combined resilient bearing and drive for vehicle wheels the combination of a driving hub portion having parallel side plates, a driven rim portion mounted to have limited sliding movement on the hub between the side plates, a plurality of radially disposed and telescoping casings mounted on the hub between the side plates, spring elements in said telescoping casings normally acting to distend the same, said telescoping casings and the wheel rim portion constructed with cone elements, and spherical members interposed between said cone elements, substantially as set forth.

3. In a combined resilient bearing and drive for vehicle wheels the combination of a driving hub portion having parallel side plates, a driven rim portion mounted to have limited radial movement on the hub between said side plates, cone elements mounted on the hub between the side plates, telescoping devices mounted on the rim and constructed with cone elements, springs contained in said telescoping devices respectively, and ball members cooperable with the cone elements or said hub and rim portions respectively, substantially as set forth.

In testimony whereof I affix my signature.

BENJAMIN F. SEYMOUR.